US005617724A

United States Patent [19]

Ko

[11] Patent Number: 5,617,724

[45] Date of Patent: Apr. 8, 1997

[54] HYDRAULIC CONTROL SYSTEM FOR USE IN A FORKLIFT TRUCK

[75] Inventor: Hyun G. Ko, Incheon, Rep. of Korea

[73] Assignee: Daewoo Heavy Industries Ltd., Incheon, Rep. of Korea

[21] Appl. No.: 580,558

[22] Filed: Dec. 29, 1995

[30] Foreign Application Priority Data

Dec. 30, 1994 [KR] Rep. of Korea ...................... 94-40199

[51] Int. Cl.[6] ...................................................... F16D 31/02

[52] U.S. Cl. ................................................ 60/422; 60/486

[58] Field of Search .............................. 60/421, 422, 426, 60/430, 468, 486; 91/516, 532

[56] References Cited

U.S. PATENT DOCUMENTS

| | | | |
|---|---|---|---|
| 4,449,365 | 5/1984 | Hancock | 60/422 |
| 4,635,439 | 1/1987 | Wible | 60/422 X |
| 4,819,430 | 4/1989 | Becker | 60/422 X |
| 5,413,452 | 5/1995 | Lech et al. | 60/422 X |

*Primary Examiner*—John E. Ryznic
*Attorney, Agent, or Firm*—Lowe, Price, LeBlanc & Becker

[57] ABSTRACT

A hydraulic control system is provided for use in a forklift truck having an engine, a steering cylinder, a lift cylinder, a tilt cylinder, a steering pump rotatably driven by the engine for producing a steering fluid under pressure to actuate the steering cylinder and a main pump for generating a working fluid under pressure to actuate the lift and tilt cylinders. The system includes a steering control valve unit for changing flow path of the steering fluid to control movement of the steering cylinder, a priority valve lying between the steering pump and the steering control valve unit for supplying the steering control valve unit with a controlled amount of the steering fluid, a main control valve unit selectively connected to the main pump and adapted to control movement of the lift and tilt cylinders and a stall valve remaining, when the engine is rotating at no greater than a preselected rpm, in a first position in which the working fluid is bypassed to the priority valve and, when the engine is rotating at greater than the preselected rpm, shifted to a second position in which the working fluid is fed to the main control valve unit.

5 Claims, 3 Drawing Sheets

HYDRAULIC CONTROL SYSTEM FOR USE IN A FORKLIFT TRUCK

FIELD OF THE INVENTION

The present invention pertains generally to a forklift truck and more particularly to a hydraulic control system for the forklift truck whereby such fluid pressure actuators as steering cylinder, lift cylinder and tilt cylinder can be controlled to effectively perform the tasks assigned thereto.

DESCRIPTION OF THE PRIOR ART

As widely known in the art, the conventional hydraulic control system for those forklift trucks having a load capacity of more than 5 tons is designed to employ a steering pump for the production of a steering fluid under pressure which is to be used in a steering control part and a main pump for the generation of a working fluid under pressure which is to be utilized in a working control part. The steering control part includes a steering cylinder, a steering control valve unit adapted to change flow path of the steering fluid to control actuation of the steering cylinder, depending on the turning direction and speed of a steering wheel, and a priority valve installed intermediate the steering pump and the steering control valve unit for enabling a constant mount of the steering fluid to be delivered from the steering pump to the steering control valve unit.

The working control part includes, among other things, a lift cylinder, a tilt cylinder and a main control valve unit adapted to independently control the movement of the lift and tilt cylinders by use of the working fluid supplied from the main pump. Moreover, a stall valve is usually employed in the hydraulic control system to prevent "death" or shutoff of an engine due to the overload that might be applied to the main pump as the lift cylinder and/or the tilt cylinder is actuated at a low engine rpm range.

Illustrated in FIG. 1 is a typical hydraulic control system which has been put into practical use to control movement of various actuators in a forklift truck. The hydraulic control system is provided with a small capacity steering pump 10 and a large capacity main pump 12, both of which are rotatingly driven by means of an engine 14 to produce, respectively, steering fluid and working fluid under pressure. The steering pump 10 is in fluid communication with a steering cylinder 16 by way of a priority valve 18 and a steering control valve unit 20. In parallel with the priority valve 18, a steering relief valve 22 is connected to the steering pump 10 in order to drain the steering fluid to a reservoir 24 when the pressure of the steering fluid increases beyond a permissible extent. The main pump 12 is in fluid communication with a lift cylinder 26 and a tilt cylinder 28 by way of a stall valve 30 and a main control valve unit 32. In parallel to the main control valve unit 32, a stall relief valve 34 is connected to the stall valve 30 to drain the working fluid at a first relief pressure. The main control valve unit 32 includes a lift cylinder control valve 36, a tilt cylinder control valve 38 and a main relief valve 40 designed to drain the working fluid at a second relief pressure higher than the first relief pressure.

With the hydraulic control system constructed as above, the main pump 12 will continue to produce a working fluid of lower pressure as long as the engine 14 is rotating at a low speed, e.g., less than 1000 rpm. In this state, the stall valve 30 remains in a first operative position as shown in FIG. 1 to put the main control valve unit 32 in communication with the stall relief valve 34 as well as the main pump 12. If either the lift cylinder control valve 36 or the tilt cylinder control valve 38 in the main control valve unit 32 is shifted from a neutral position as depicted in FIG. 1 to an operative position, the working fluid will be fed to the lift cylinder 26 or the tilt cylinder 28, resulting in an abrupt increase in the working fluid pressure. This load pressure will be transmitted back to the stall relief valve 34 via the main control valve unit 32 and the stall valve 30. Thus the stall relief valve 34 will drain the working fluid to the reservoir 24 to make sure that the load pressure should not be delivered to the main pump 12, which would otherwise cause the engine 14 to "stall" or stop.

In the event that the engine rpm is increased to, e.g., more than 1000, the main pump 12 will produce a working fluid of higher pressure to have the stall valve 30 automatically shifted to a second operative position not shown in FIG. 1, thereby disconnecting the stall relief valve 34 from the main pump 12 and the main control valve unit 32. In this state, the load pressure acting on the lift cylinder 26 or the tilt cylinder 28 will not be drained unless it reaches the second relief pressure of the main relief valve 40. Since the engine 14 is rotating at more than 1000 rpm, it will not be subjected to any stalling even if the higher load pressure is delivered back to the main pump 12.

Meanwhile, the steering fluid discharged in the steering pump 10 will be supplied to the steering control valve unit 20 via the priority valve 18 that can act as a pressure compensator valve for, regardless of the discharge fluid volume of the steering pump 10, supplying a controlled volume of the steering fluid to the steering control valve unit 20. The fluid volume $Q_r$ to be fed to the steering control valve unit 20 depends on or varies with the nominal fluid quantity $q_{th}$(cc/rev) discharged by the steering control valve unit 20 and the maximum turning speed Nh(rpm) of a steering wheel, as given by the following equation:

$$Qr=N_h \times q_{th}/1000 \qquad [I]$$

And, the threshold fluid quantity $Q_p$ discharged by the steering pump 10 should be great enough to assure a stable steering operation even when the engine 14 is rotating at a low, idle rpm, as expressed by the following equation:

$$Q_P=(Ne)l \times q_{th2} \times V/1000 \geqq Q_r \qquad [II]$$

wherein (Ne)l denotes the idle rpm of the engine, $q_{th2}$ the nominal fluid quantity it discharged by the steering control valve unit and V the volumetric efficiency of the steering pump.

Analyzing the correlation of equations [I] and [II] reveals that the threshold fluid quantity $Q_P$ ought to be increased above the required fluid volume $Q_r$ in response to the engine rpm increase. For that reason, the surplus fluid quantity produced by the steering pump 10 has to be drained to the reservoir 24 via the steering relief valve 22, thus deteriorating the efficiency of the hydraulic control system and hence the fuel economy of the engine.

SUMMARY OF THE INVENTION

Accordingly, it is an object of the invention to provide a hydraulic control system for use in a forklift truck that enables the working fluid produced by a main pump to be used for the steering purpose at a low engine rpm, thereby minimizing the fluid discharge quantity of a steering pump and economizing operation of the system.

Another object of the invention is to provide a hydraulic control system for use in a forklift truck that can eliminate the need for a steering relief valve to permit lower cost and less complexity of the system.

With these objects in view, the present invention provides a hydraulic control system for use in a forklift truck having an engine, a steering cylinder, a lift cylinder, a tilt cylinder, a steering pump rotatably driven by the engine for producing a steering fluid under pressure to actuate the steering cylinder and a main pump for generating a working fluid under pressure to actuate the lift and tilt cylinders, comprising: a steering control valve unit for changing flow path of the steering fluid to control movement of the steering cylinder; a priority valve lying between the steering pump and the steering control valve unit for supplying the steering control valve unit with a controlled amount of the steering fluid; a main control valve unit selectively connected to the main pump and adapted to control movement of the lift and tilt cylinders; and a stall valve remaining, when the engine is rotating at no greater than a preselected rpm, in a first position in which the working fluid is bypassed to the priority valve and, when the engine is rotating at greater than the preselected rpm, shifted to a second position in which the working fluid is fed to the main control valve unit.

BRIEF DESCRIPTION OF THE DRAWINGS

The above and other objects, features, advantages of the invention will become apparent form a review of the following detailed description of the preferred embodiment taken in conjunction with the accompanying drawings, in which.

DETAILED DESCRIPTION OF THE PREFERRED EMBODIMENT

Figure 1:
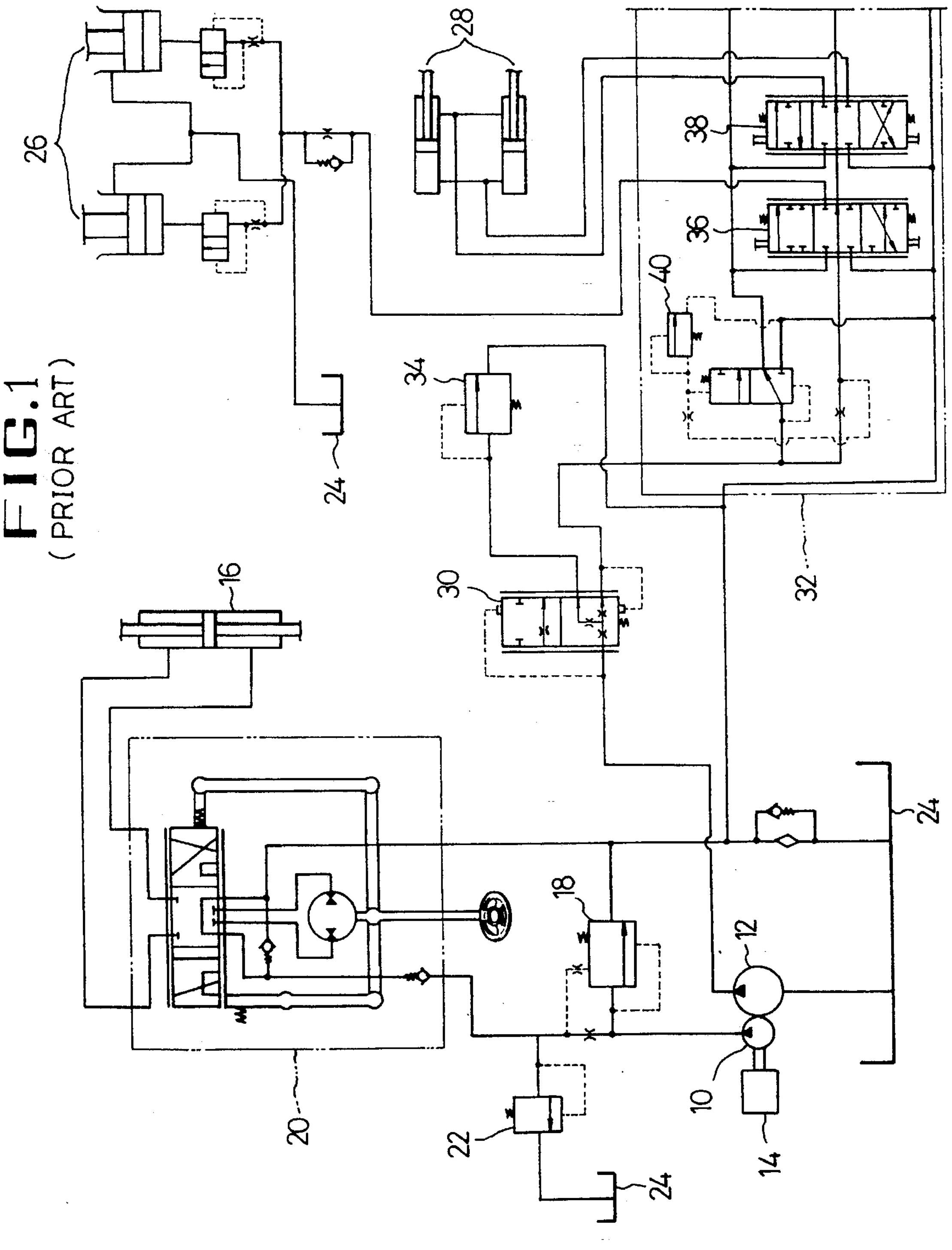
FIG.1 (PRIOR ART)
FIG. 1 is a fluid pressure circuit diagram showing the conventional hydraulic control system.
Figure 2:
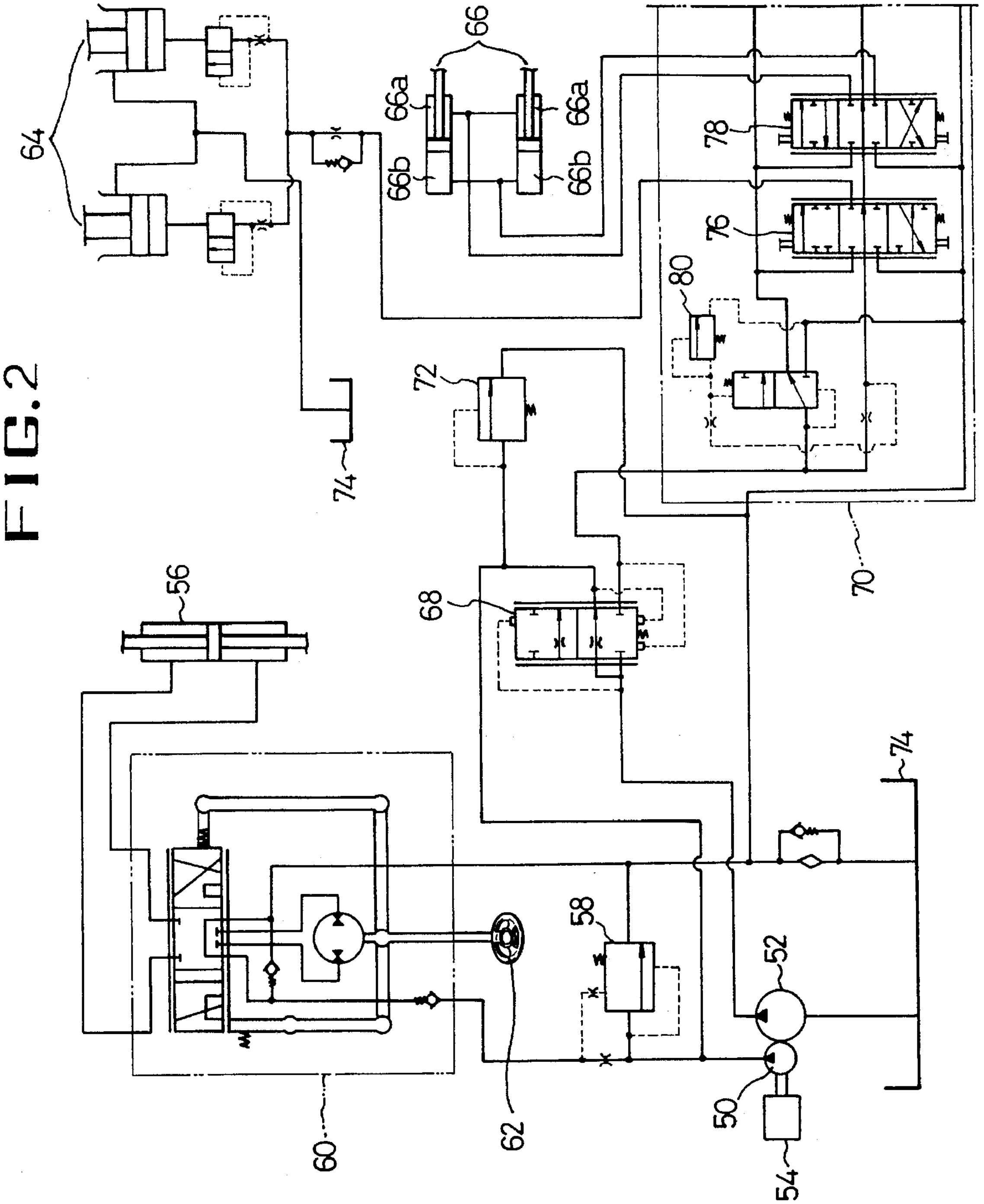
FIG. 2 is a fluid pressure circuit diagram illustrating the hydraulic control system in accordance with the invention.

Referring now to FIG. 2, it can be seen that the hydraulic control system of the invention includes a steering pump 50 and a main pump 52, both of which are rotatingly driven by an engine 54 to generate, respectively, a steering fluid of relatively low pressure and a working fluid of relatively high pressure. The steering pump 50 is in fluid communication with a steering cylinder 56 via a priority valve 58 and a steering control valve unit 60. The priority valve 58 serves to supply a controlled volume of the steering fluid to the steering control valve unit 60, regardless of the fluctuation in the fluid quantity discharged from the steering pump 50. The steering control valve unit 60 is adapted to change flow path of the steering fluid, depending on the turning direction and speed of a steering wheel 62, to thereby control the movement of the steering cylinder 56.

On the other hand, the main pump 52 is in fluid communication with the lift cylinder 64 and the tilt cylinder 66 via a stall valve 68 and a main control valve unit 70. In parallel with the main control valve unit 70, a stall relief valve 72 is connected to the stall valve 68 to drain the working fluid to a reservoir 74 at a first relief pressure. The stall relief valve 72 is also in fluid communication with the steering pump 50 and the priority valve 58 to allow the steering fluid to be drained to the reservoir 74 at the first relief pressure. The main control valve unit 70 includes a lift control valve 76 shiftable between a neutral position, an active position in which the working fluid is supplied to the lift cylinder 64 and a drain position in which the working fluid is drained from the lift cylinder 64 to the reservoir 74. The main control valve unit 70 further includes a tilt control valve 78 shiftable between a neutral position, a first active position in which the working fluid is admitted into a first chamber **66*a* of the tilt cylinder 66 and a second active position in which the working fluid is fed to a second chamber 66*b* of the tilt cylinder 66. A main relief valve 80 is also provided in the main control valve unit 70 to drain the working fluid to the reservoir 74 at a second relief pressure which is far greater than the first relief pressure of the stall relief valve 72**.

The stall valve 68 is so designed as to, when the engine 54 is rotating at no greater than a preselected rpm, e.g., idle rpm, remain in a first operative position in which the working fluid is bypassed to the priority valve 58 and, when the engine 54 is rotating at greater than the preselected rpm, be shifted to a second operative position in which the working fluid is fed to the main control valve unit 70.

Figure 3:
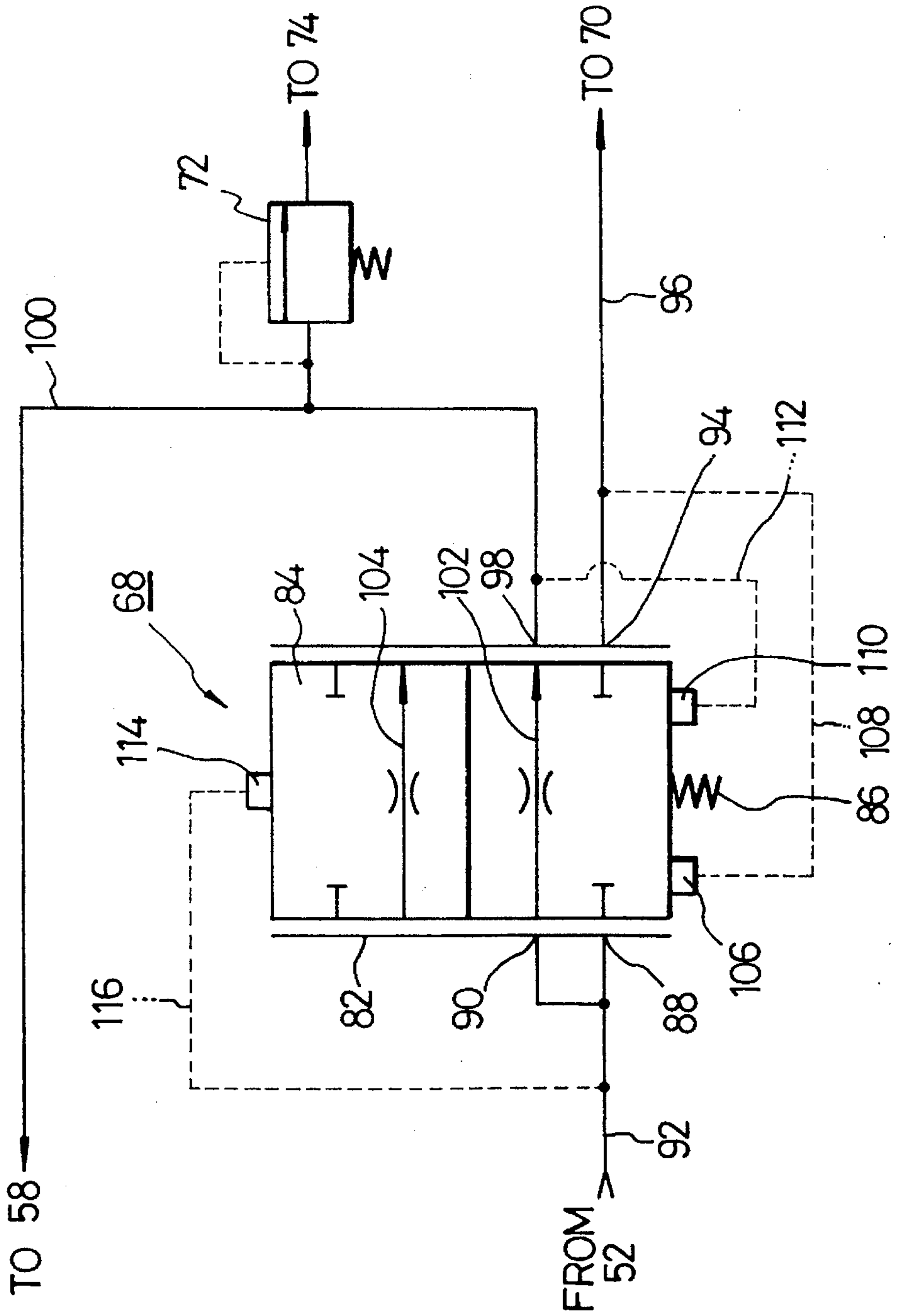
FIG. 3 is an enlarged view best showing the stall valve and the stall relief valve employed in the hydraulic control system in FIG. 2.

As best shown in FIG. 3, the stall valve 68 includes a valve body 82, a valve spool 84 slidably fitted to the valve body 82 for movement between the first position as shown in FIG. 3 and the second position not shown in the drawing and a compression spring 86 adapted to normally bias the valve spool 84 into the first position. The valve body 82 has first and second inlet ports 88, 90 both connected to the main pump 52 via a main inflow line 92, a first outlet port 94 formed in exact alignment with the first inlet port 88 and connected to the main control valve unit 70 via a main outflow line 96 and a second outlet port 98 formed in exact alignment with the second inlet port 90 and connected to the priority valve 58 via a bridge line 100. The valve spool 84 has a first orifice path 102 adapted to connect the second inlet and outlet ports 90, 98 in case of the valve spool 84 being in the first position as shown in FIG. 3 and a second orifice path 104 adapted to connect the first inlet and outlet ports 88, 94 when the valve spool 84 is shifted to the second position.

In addition, the valve body 82 is further provided with a first pilot chamber 106 in communication with the first outlet port 94 via a first pilot line 108 for allowing the fluid in the main outflow line 96 to urge the valve spool 84 toward the first position, a second pilot chamber 110 in communication with the second outlet port 98 via a second pilot line 112 for permitting the fluid in the bridge line 100 to further urge the valve spool 84 toward the first position and a third pilot chamber 114 in communication with the first and second inlet ports 88, 90 via a third pilot line 116 for allowing the fluid in the main inflow line 92 to bias the valve spool 84 toward the second position.

The stall relief valve 72 is connected both to the stall valve 68 and the priority valve 58 via the bridge line 100 so that the fluid in the bridge line 100 can be drained to the reservoir 74 when the fluid pressure exerting on the priority valve 58 exceeds the first relief pressure.

Operation of the hydraulic control system will now be described with emphasis placed on the stall valve as illustrated in FIG. 3. At the time when the engine is rotating at, e.g., no greater than 1000 rpm, the main pump 52 will produce a working fluid of relatively low pressure which can pass through the first orifice path 102 with no or little constriction. This means that the pilot pressure in the third pilot chamber 114 remains low and therefore cannot overwhelm the pilot pressures in the first and second pilot chambers 106, 110 plus the biasing force of the compression spring 86. As a result, the valve spool 84 of the stall valve 68 will be kept in the first position as illustrated in FIG. 3.

With the valve spool 84 remaining in the first position, the working fluid discharged by the main pump 52 will flow through the main inflow line 92, the second inlet port 90, the second outlet port 98, the bridge line 100 and then be combined with the steering fluid to create a mixture fluid of added pressure. The mixture fluid will be fed to the steering control valve unit 60 by way of the priority valve 58. At this moment, if the pressure of the mixture fluid exceeds the first relief pressure set by the stall relief valve 72, the mixture fluid will be drained through the stall relief valve 72 to the reservoir 74.

As set forth above, since the working fluid discharged by the main pump 52 will be added to the steering fluid during the time the engine 54 is rotating at no greater than 1000 rpm, it becomes possible to minimize the discharge quantity $Q_P$ of the steering pump 50, as demonstrated by the equations:

$$Q_r \leqq Q_P = Nl(1000\ \text{rpm}) \times q_{th2} \times V/1000 \quad \text{[III]}$$

$$Q_r \times 1000/(V \times 800\ \text{rpm} \geqq q_{th2} \geqq Q_r \times 1000\ \text{rpm}) \quad \text{[IV]}$$

wherein $Q_r$ denotes the fluid quantity to be supplied to the steering control valve unit, Nl the engine rpm, $q_{th2}$ the discharge fluid volume of the steering control valve unit and V the volumetric efficiency of the steering pump. Equation [IV] is based on the assumption that the idle rpm of the engine is equal to 800.

In case where the engine rpm is increased to above 1000, the main pump 52 will produce a working fluid of relatively high pressure which should be constricted by the first orifice path 102. This will increase the pilot pressure in the third pilot chamber 114 to such an extent that overwhelms the pilot pressures in the first and second pilot chambers 106, 110 plus the biasing force of the compression spring 86. Accordingly, the valve spool 84 of the stall valve 68 will be shifted to the second position, allowing the working fluid to flow through the first inlet port 88, the second orifice path 104, the first outlet port 94 and the main outflow line 96 to the main control valve unit 70.

While the invention has been shown and described with reference to a preferred embodiment, it should be apparent to one of ordinary skill that many changes and modifications may be made without departing from the spirit and scope of the invention as defined in the claims.

What is claimed is:

1. A hydraulic control system for use in a forklift truck having an engine, a steering cylinder, a lift cylinder, a tilt cylinder, a steering pump rotatably driven by the engine for producing a steering fluid under pressure to actuate the steering cylinder and a main pump for generating a working fluid under pressure to actuate the lift and tilt cylinders, comprising:

a steering control valve unit for changing flow path of the steering fluid to control movement of the steering cylinder;

a priority valve lying between the steering pump and the steering control valve unit for supplying the steering control valve unit with a controlled amount of the steering fluid;

a main control valve unit selectively connected to the main pump and adapted to control movement of the lift and tilt cylinders; and a stall valve remaining, when the engine is rotating at no greater than a preselected rpm, in a first position in which the working fluid is bypassed to the priority valve and, when the engine is rotating at greater than the preselected rpm, shifted to a second position in which the working fluid is fed to the main control valve unit.

2. The hydraulic control system for use in a forklift truck as recited in claim 1, further comprising a stall relief valve in fluid communication with the stall valve and the priority valve for draining the working fluid and the steering fluid when the fluid pressure exerting on the priority valve exceeds a predetermined relief pressure.

3. The hydraulic control system for use in a forklift truck as recited in claim 1, wherein the stall valve includes a valve body, a valve spool slidably fitted to the valve body for movement between the first position and the second position and a compression spring for normally biasing the valve body into the first position, the valve body having first and second inlet ports both connected to the main pump via a main inflow line, a first outlet port formed in an alignment with the first inlet port and connected to the main control valve unit via a main outflow line and a second outlet port formed in an alignment with the second inlet port and connected to the priority valve via a bridge line, the valve spool having a first orifice path adapted to connect the second inlet and outlet ports in the first position and a second orifice path adapted to connect the first inlet and outlet ports in the second position.

4. The hydraulic control system for use in a forklift truck as recited in claim 3, wherein the valve body further has a first pilot chamber in communication with the first outlet port for allowing the fluid in the main outflow line to urge the valve spool toward the first position, a second pilot chamber in communication with the second outlet port for allowing the fluid in the bridge line to further urge the valve spool toward the first position and a third pilot chamber in communication with the first and second inlet ports for permitting the fluid in the main inflow line to bias the valve spool toward the second position.

5. The hydraulic control system for use in a forklift truck as recited in claim 3, further comprising a stall relief valve in fluid communication with the the stall valve and the priority valve via the bridge line for draining the fluid in the bridge line when the fluid pressure exerting on the priority valve exceeds a predetermined relief pressure.

* * * * *